United States Patent [19]

Schmidt

[11] Patent Number: 4,516,702

[45] Date of Patent: May 14, 1985

[54] DRIPLESS VALVE

[75] Inventor: Robert W. Schmidt, Oak Lawn, Ill.

[73] Assignee: Copar Corporation, Oak Lawn, Ill.

[21] Appl. No.: 447,154

[22] Filed: Dec. 6, 1982

[51] Int. Cl.$^3$ .............................................. B05B 1/28
[52] U.S. Cl. .................................... 222/514; 222/571; 141/116; 239/119
[58] Field of Search ............... 222/571, 108, 514, 559; 141/116, 117, 119; 239/104, 110, 119

[56] References Cited

U.S. PATENT DOCUMENTS

| | | | |
|---|---|---|---|
| 2,619,116 | 11/1952 | Ralston | 222/571 X |
| 3,547,148 | 12/1970 | Drori | 222/571 X |
| 3,806,084 | 4/1974 | Seese | 222/571 X |
| 4,062,480 | 12/1977 | Bjorklund | 222/571 |
| 4,142,707 | 3/1979 | Bjorklund | 222/571 X |
| 4,149,315 | 4/1979 | Page et al. | 222/571 X |

Primary Examiner—Joseph J. Rolla
Assistant Examiner—Frederick R. Handren
Attorney, Agent, or Firm—Kinzer, Plyer, Dorn & McEachran

[57] ABSTRACT

A valve for applying a flowable material in which it is desired to provide a sharp cutoff in application of the material includes a valve body with a chamber therein in communication with a source of the material to be applied. A movable piston is positioned within the valve body and there is a passage in the piston opening to the chamber with the passage terminating in an application opening. A movable valve stem is positioned to open and close upon the passage chamber opening to control the flow of material to the passage and application opening. A negative pressure is created at the application opening at or immediately after closure of the valve stem upon the passage chamber opening to thereby provide a sharp cutoff in the application of the material from the opening.

5 Claims, 1 Drawing Figure

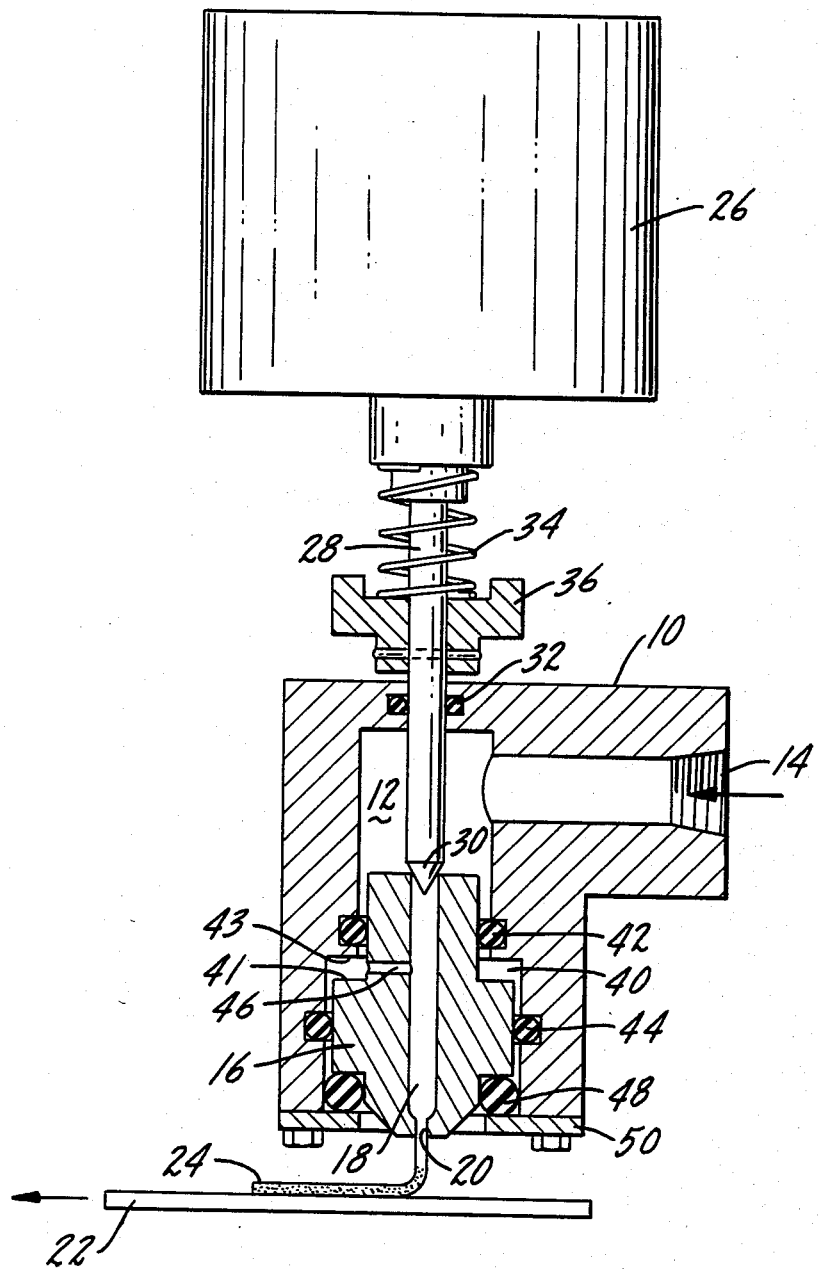

DRIPLESS VALVE

SUMMARY OF THE INVENTION

The present invention relates to valves having particular utility in the application of a flowable material, such as a glue or similar viscous substance.

A primary purpose of the invention is a valve of the type described which creates a sharp cutoff in the application of material therefrom by creating a negative pressure at the valve application opening at the time of valve closure.

Another purpose is a simply constructed reliably operable dripless valve having utility in the application of glue to corrugated boxes or the like.

Another purpose is a valve of the type described in which the negative pressure at the valve application opening at the time of valve closure is caused by permitting a slight degree of movement of a piston which contains the valve application opening.

Another purpose is a valve of the type described in which the movable valve stem which controls communication between the valve and a source of the substance to be applied itself provides the necessary movement to create the negative pressure to suck back any substance then present at the valve application opening.

Another purpose is a valve of the type described which uses a variable volume chamber to provide a negative pressure at the valve application opening.

Other purposes will appear in the ensuing specification, drawing and claims.

BRIEF DESCRIPTION OF THE DRAWING

The invention is illustrated diagrammatically in the attached drawing illustrating a preferred embodiment of the invention.

DESCRIPTION OF THE PREFERRED EMBODIMENT

The present invention will be described in the context of a valve useful in the application of glue to moving corrugated board. The invention has substantially wider utility and is useful in any application in which a flowable material or substance is to be applied in controlled amounts. Such substance might be a viscous liquid. Glue, paint and the like, oil or grease are examples. The substance might also be granular, particularly of a very fine particle size in which the granular material is essentially flowable when applied under pressure. The invention should not be limited to the application of any type of material and is more specifically directed to what may be termed a dripless valve or a valve in which there is a sharp cutoff in the application of the substance or material being controlled.

Considering the application of the valve in the field of applying glue to moving corrugated board, it has been common past practice to apply glue to a moving corrugated board by means of a wheel running against the surface to which glue is to be applied. This method has been used for many years, but has a number of shortcomings. At high speeds some glue adheres to neither the box nor to the glue wheel and thus uncontrollably flies about the area, creating a mess. It was also difficult to control the quantity of glue and oftentimes there would be too much glue in one location and not enough in another. Perhaps the greatest difficulty with the use of a wheel to apply glue was that it was essentially impossible to have interrupted glue patterns or glue areas in which the glue area did not extend from one end of the box or box flap to the other.

The disadvantages of the glue application wheel led to the development of an electronically controlled glue extrusion gun. Although the gun was a vast improvement over the wheel, it also had numerous disadvantages. While it was possible to start and stop the flow of adhesive with a gun, thereby providing glue patterns, the viscosity and surface tension of the glue often caused the pattern to extend beyond the point where the glue valve was closed. This was caused by the glue on the board pulling glue out of the applicator holes downstream of the point where the actual closure occurred inside the valve.

One attempted solution was to place the glue extrusion heads directly in contact with the area to be glued. This does not always solve the "trail-off" problem and in addition created a problem in that it was not always possible to maintain the glue extrusion head in contact with the moving corrugated board. This is particularly true with increased board speeds.

Such problems with extrusion heads led to the raising of the extrusion head from the board and the squirting or pressure application of glue from the extrusion head toward the board in the desired glue pattern. However, there remained the problem of a tail or trail-off or at times even a small dot positioned beyond the desired glue pattern. Heretofore, it simply was not possible in glue extrusion heads or applicator valves to provide a sharp cutoff of the glue as the viscosity and surface tension of the substance itself simply would not permit an immediate end to the glue pattern when the valve was closed.

The present invention solves the above-described problem by creating a negative pressure at the glue application openings at or immediately after closure of the application valve, which negative pressure sucks back any glue remaining at the opening at the time of valve closure.

In the drawing, a valve body is indicated at 10 and has a glue chamber therein indicated at 12 which is in communication through a port 14 with a pressurized source of glue or adhesive. A piston 16 is movable within valve body 10 and includes a passage 18 terminating in a small application opening 20. Opening 20 is positioned directly above the material to be glued indicated at 22 and a bead or strip of glue is indicated at 24 being applied from the opening onto material 22.

A valve actuator is indicated at 26 and may for example be an electrically-operated solenoid or an air-operated actuator. In either event, extending outwardly from actuator 26 is a valve stem 28 having a valve closure tip 30 positioned to close upon that portion of passage 18 opening into chamber 12. A seal ring 32 is positioned about stem 28 in the opening in which the stem passes through the valve body to form a seal at that point. A compression spring 34 extends about valve stem 28 between the actuator and a spring support 36 fixed on the stem 28 and functions as a return spring to cause the valve to move to its closed position in the drawing.

As shown herein, the valve stem is moved to a closing position by spring 34 with the actuator causing the stem to move away from or open communication between passage 18 and chamber 12. The reverse is equally satisfactory as is an arrangement in which the actuator provides both opening and closing movement. In like manner, the particular type of actuator, electrical, pneumatic or otherwise, is not critical or essential to the invention.

There is a second chamber within valve body 10 indicated at 40, which second chamber is defined between exterior surface 41 of piston 16 and facing interior surface 43 of a portion of valve body 10. The chamber is further defined between a seal ring 42, at the upper end of the chamber, and a second seal ring 44, at the lower end of the chamber. Because O-rings 42 and 44 are different in diameter, chamber 40 is variable in volume. A small passage 46 connects chamber 40 with piston passage 18. The structure is completed by a seal ring 48, functioning as a support spring for piston 16. Seal ring 48 is supported upon a small plate or the like 50 at the bottom of the valve body, with the ring itself supporting the piston and permitting a slight degree of movement of the piston as valve stem 28 closes upon the chamber opening of passage 18.

In operation, and assuming chamber 12 is charged with glue, and assuming initially that O-ring 48 is compressed to a very slight degree because of the pressure of glue in chamber 12 and the downward force of the stem caused by spring 34, when the actuator causes the stem to pull away from the chamber opening of passage 18, glue will flow from chamber 12 down through passage 18 and will be applied in the manner shown. When the valve is to be closed, actuator 26 will be de-energized permitting spring 34 to cause valve stem 28 to close upon passage 18, thus shutting off further flow of glue from chamber 12 to application opening 20.

When the valve stem so closes, two events occur in rapid sequence. First, the valve stem stops the flow of glue. The force of the compression or return spring 34 exerts a downward force in an amount sufficient to slightly compress O-ring or spring 48. When this occurs, movement of piston surface 41 away from valve body surface 43 causes an increase in the volume of chamber 40 defined between differentially sized seal rings 42 and 44. Such an increase in the volume of chamber 40 causes a sufficient negative pressure at application opening 20 to the point that any adhesive remaining at the application opening will be sucked back up into passage 18 and held there by the negative pressure. Thus, any trail-off of glue is prevented as at the time of valve closure or immediately thereafter, the negative pressure will not permit any further flow of glue.

It is desirable to suck the glue back from the tip, but not to such a degree as to bring air to any appreciable extent up into passage 18, as this could cause a problem in the following glue pattern, as there would then be a delay in the application of glue in that pattern.

As the valve opens, the slight expansion of ring 48 causes movement of piston 16 which in turn slightly decreases the volume of chamber 40 to provide a slight flow of glue just before the valve stem leaves its seat on the piston.

As an example of a specific embodiment of the valve, the diameter of glue application opening 20 was 0.02 inch. O-ring 42 had an OD of 5/16-inch and an ID of 3/16-inch. O-ring 44 had an OD of ⅜-inch and an ID of ¼-inch. The corresponding diameters of piston 16 were 3/16-inch and ¼-inch, respectively. Since the difference in areas between the two diameters multiplied by the travel of the piston will equal the diameter of opening 20 times the amount of suck-back at the application opening, it is possible, once the amount of suck-back has been determined, to calculate the necessary travel of the piston. Assuming the dimensions above described and that the desired suck-back is 1/32-inch, piston travel need only be 0.00043 inch. Thus, in actual practice, to have a negative pressure sufficient to suck back or draw back the adhesive only 1/32-inch, the travel of piston 16 need only be 0.00043 inch. Considering an application valve which will operate many times per second in current box manufacturing plants, travel of that distance can easily be accomodated.

The invention should not be limited to the use of an O-ring as the spring controlling travel of the piston. A Bellville washer or other type of spring is also satisfactory. In like manner, the differential volume which creates the negative pressure is only one means of implementing a negative pressure at the glue application opening.

Whereas the preferred form of the invention has been shown and described herein, it should be realized that there may be many modifications, substitutions and alterations thereto.

The embodiments of the invention in which an exclusive property or privilege is claimed are described as follows:

1. A valve for applying a flowable material in which it is desired to provide a sharp cutoff in application of the material including:
   a valve body and a chamber therein, said chamber being in communication with a source of the material to be applied,
   a movable piston positioned within said valve body, a passage in said piston opening to said chamber, said passage terminating in an application opening,
   a movable valve stem positioned to open and close upon said passage chamber opening to control the flow of material to said passage and application opening,
   and means for creating a negative pressure at said application opening at or immediately after closure of said valve stem upon said passage chamber opening to thereby provide a sharp cutoff in the application of the material from said opening.

2. The valve of claim 1 further characterized in that the means for creating a negative pressure includes a second chamber defined in part by said movable piston, said second chamber being connected to said piston passage, with movement of said piston responsive to valve closure movement of said valve stem changing the volume of said second chamber to create a negative pressure at the application passage opening.

3. The valve of claim 2 further characterized in that said second chamber is defined by the exterior of said piston, an interior portion of said valve body, and differentially sized spaced seal members positioned between said piston and valve body, and spring means supporting said piston within said valve body, said spring means permitting a degree of piston movement consistent with the desired negative pressure at said passage application opening.

4. The valve of claim 3 further characterized in that said spring means is formed by a seal member.

5. The valve of claim 1 further characterized by and including a valve actuator attached to said valve stem.

* * * * *